US008691257B2

(12) United States Patent
Hartman et al.

(10) Patent No.: US 8,691,257 B2
(45) **Date of Patent: *Apr. 8, 2014**

(54) WATER SOLUBLE LAUNDRY BAG AND RECEPTACLE THEREFOR

(75) Inventors: Keith Hartman, Hamilton, OH (US); David Mesko, Wyoming, OH (US); Tim Magee, New Braunfels, TX (US); Richard Gerlach, Loveland, OH (US)

(73) Assignee: Cintas Corporation, Cincinnati, OH (US)

( * ) Notice: Subject to any disclaimer, the term of this patent is extended or adjusted under 35 U.S.C. 154(b) by 636 days.

This patent is subject to a terminal disclaimer.

(21) Appl. No.: 12/956,731

(22) Filed: Nov. 30, 2010

(65) Prior Publication Data

US 2011/0127270 A1 Jun. 2, 2011

Related U.S. Application Data

(60) Provisional application No. 61/265,074, filed on Nov. 30, 2009.

(51) Int. Cl.

| | |
|---|---|
| ***A01N 25/34*** | (2006.01) |
| ***B65D 85/00*** | (2006.01) |
| ***D06L 1/20*** | (2006.01) |

(52) U.S. Cl.

USPC ........... 424/412; 424/413; 424/438; 426/138; 426/234; 426/237; 426/240; 426/635; 264/918; 8/137; 8/158; 68/16; 68/20; 68/58; 68/59; 68/148; 68/158; 68/159; 68/205 R

(58) Field of Classification Search

USPC ........ 8/137, 158, 159; 68/16, 20, 58, 59, 148, 68/158, 159, 205; 428/35.7; 424/412, 413, 424/438; 426/234, 237, 240, 635; 264/918

See application file for complete search history.

(56) References Cited

U.S. PATENT DOCUMENTS 3,209,977 A 10/1965 Lewis et al.
3,279,511 A 10/1966 Griffin, Jr.

(Continued)

FOREIGN PATENT DOCUMENTS

DE 3017246 A1 11/1981
EP 0398754 A2 11/1990

(Continued)

OTHER PUBLICATIONS

International Searching Authority; The International Search Report and The Written Opinion of The International Searching Authority, or the Declaration, PCT/US2010/058354; Aug. 22, 2011; 11 pages.

(Continued)

*Primary Examiner* — Gregory R Delcotto
*Assistant Examiner* — Preeti Kumar
(74) *Attorney, Agent, or Firm* — Wood, Herron & Evans, LLP

(57) ABSTRACT

A water soluble bag for containing soiled textiles, said bag having an open end, a closed end, and sides extending therebetween, said bag made of a plastic film having a thickness of at least 1.3 mils, wherein said bag dissolves in water at a temperature of 165° F. in less than about 250 seconds and does not dissolve in water at a temperature of 85° F. in 7 days, and said bag being capable of containing at least 175 lbs. of soiled textiles and having a capacity of at least 50 gallons. Also disclosed is a receptacle for collecting soiled textiles comprising a container and a water soluble bag. Also disclosed is a receptacle for collecting soiled textiles comprising a container, a sling, and a water soluble bag.

8 Claims, 9 Drawing Sheets

(56) References Cited

U.S. PATENT DOCUMENTS

| | | | | |
|---|---|---|---|---|
| 3,632,039 | A | 1/1972 | Gayle | |
| 3,652,371 | A * | 3/1972 | Hirata | 428/58 |
| 3,762,454 | A | 10/1973 | Wilkins, Jr. | |
| 4,356,099 | A | 10/1982 | Davies et al. | |
| 4,489,455 | A * | 12/1984 | Spendel | 8/158 |
| 5,198,198 | A | 3/1993 | Gladfelter et al. | |
| 5,535,913 | A | 7/1996 | Asbach et al. | |
| 5,655,680 | A | 8/1997 | Asbach et al. | |
| 6,048,410 | A | 4/2000 | Honeycutt | |
| 6,057,015 | A * | 5/2000 | Blum et al. | 428/35.7 |
| 6,224,259 | B1 | 5/2001 | Guerra | |
| 6,386,386 | B1 | 5/2002 | George | |
| 6,668,751 | B1 | 12/2003 | Henke | |
| 6,713,140 | B2 * | 3/2004 | McCormack et al. | 428/36.6 |
| 6,902,080 | B2 | 6/2005 | Busch | |
| 7,073,676 | B1 | 7/2006 | Town | |
| 7,217,385 | B2 | 5/2007 | Taylor et al. | |
| 7,255,242 | B2 | 8/2007 | Shalit | |
| 8,435,311 | B2 * | 5/2013 | Hartman et al. | 8/137 |
| 2002/0150708 | A1 | 10/2002 | Dyter et al. | |
| 2003/0008085 | A1 | 1/2003 | Davenet et al. | |
| 2008/0268193 | A1 * | 10/2008 | Cherry et al. | 428/36.6 |
| 2009/0287034 | A1 * | 11/2009 | Siggelkow | 588/249.5 |

FOREIGN PATENT DOCUMENTS

| | | | |
|---|---|---|---|
| EP | 0556781 | A1 | 8/1993 |
| JP | 2001106302 | A | 4/2001 |
| JP | 2001114295 | A | 4/2001 |

OTHER PUBLICATIONS

Water Soluble Laundry Bags for Waste Disposal and Infected Linen Removal; "Stock Sizes and Pricing"; http://www.extrapackaging.com/watersoluble/stocksizes.htm; (Prices as of Dec. 2007); printed Mar. 5, 2009, p. 1-2.

Aicello SOLUBLON Water Soluble Film—PVA Grade Lineup; "Solublon PVA Film Grades" http://www.solublon.com/grades.htm; printed Feb. 23, 2009, p. 1-2.

MonoSol, LLC "Corporate Overview" http://www.monosol.com/faq.htm; printed Feb. 9, 2009, pp. 1-4.

Cintas Facility Services, "Inventory where you need it, when you need it", Advantages of Service from Cintas, Brochure (FS-1850 o.11.05); www.cintas.com; p. 1.

Cintas Facility Services, "Advantages of The Cintas Microfiber Mopping System" Remove & Eliminate, Brochure (FS-1853 o.11.05); www.cintas.com; p. 1.

Cintas Facility Services, "The Cintas Microfiber System, A Better Way of Cleaning", Brochure (FS-1857 o.6.07); www.cintas.com; p. 1-2.

Cintas Facility Services, "The Cintas Microfiber System for Healthcare Environments", Brochure (FS-1852 o.11.05); www.cintas.com; p. 1.

Cintas Facility Services, "A Simple—Highly Effective Mopping System", Brochure (FS-1854 o.11.05); www.cintas.com; p. 1.

Cintas Facility Services, "Not All Microfibers Are Created Equal", Brochure (FS-1851 r.7.06); www.cintas.com; p. 1.

Cintas Facility Services, "Microfiber A Better Way of Cleaning", The Cintas Microfiber Cleaning System, Brochure (FS-1561 o.9.06); www.cintas.com; pp. 1-4.

A Project of the Lowell Center for Substainable Production, University of Massachusetts Lowell, "10 Reasons to Use Microfiber Mopping", Copyright 2003 Sustainable Hospitals Project; p. 1-2.

SupplyLink; Microfiber Mops are Reducing Hospital Acquired Infections at Good Samaritan Hospital, "Reducing the Risk of Infection", Copyright 2008-2009 W.W. Grainger, Inc.; http://www.supplylink.com/article/hospital_acquired_infections.php; p. 1-2.

UCDavis Health System, "UC Davis Pioneers Use of Microfiber Mops in Hospitals", Jun. 23, 2006; Copyright 2009 UC Regents; http://www.ucdmc.ucdavis.edu/newsroom/releases/archives/other/2006/mop6-2006.html; p. 1-2.

Alamgir, Hasanat et al., "Epidemiology of Occupational Injury Among Cleaners in the Healthcare Sector", Occupational Medicone 2008; vol. 58 (published online Mar. 19, 2008); pp. 393-399.

Hanson, Steve, "Cleaning Health Care Facilities" Copyright 2006, The Janitorial Store; http://articles.directorym.com/Cleaning__Health_Care_Facilities-a970861.html; p. 1-2.

AceFilm, LLC; Technical Data Sheet, AceFilm DISSOLV-A-WAY 60"=60" Hot Water Soluble Sling Bags; p. 1.

AceFilm, LLC; Safety Data Sheet, "Polyvinyl Alcohol Films/Bags"; p. 1-5.

The University of Toledo Medical Center; "Bloodborne Pathogens Exposure Control Plan", FY2009 Review; http://www.utoledo.edu/policies/; p. 2.

Shred Patrol—Secure Collection Bins; "External Dagger Lock Shred Carts"; http://www.shredpatrol.com/PpodCarts.htm; printed Feb. 9, 2009, p. 1.

WaterSoluble Laundry Bags for Waste Disposal and Infected Linen Removal; "Water Soluble Laundry Bag Operating Instructions"; http://www.extrapackaging.com/watersoluble/instructions.htm; printed Feb. 19, 2009, 2 pages.

Water Soluble Bags for MRSA Contaminated Clothing, Laundry Bags, Waste Transport . . . ; "Hot and Cold Water Soluble Laundry Bags"; http://www.extrapackaging.com/watersoluble/; printed Feb. 9, 2009, p. 1-2.

* cited by examiner

WATER SOLUBLE LAUNDRY BAG AND RECEPTACLE THEREFOR

CROSS-REFERENCE TO RELATED APPLICATION

This application claims the benefit of U.S. Provisional Application No. 61/265,074, filed on Nov. 30, 2009, the disclosure of which is incorporated herein by reference.

FIELD OF INVENTION

This invention relates generally to a water soluble laundry bag, and relates specifically to a water soluble bag used for collecting, transporting and laundering soiled textiles.

BACKGROUND OF THE INVENTION

The cleaners of a healthcare facility play a vital role in limiting the spread of infections among patients. In an effort to reduce employee injuries while also improving cleanliness, healthcare facilities are now using lightweight microfiber cleaning products. While reducing employee injuries and improving cleanliness, there remains the desire to further protect the textile service providers who collect, transport and launder the soiled microfiber products. Limiting the providers' exposure to the soiled product will reduce risk of injury and infection.

Traditionally, plastic bags have been used to contain soiled textiles from the healthcare industries. The plastic bags may be small bags, which are then placed in a larger can, or they may be large trash bags placed in cans. Typically, the provider picks up the bags by hand and transfers them to a truck. While carrying flimsy plastic bags, the provider is at risk of needle sticks and exposure to pathogens if the plastic bag tears. The provider then hauls the bags to the central laundry facility, where they are unloaded. Employees rip open the bags and dump the soiled textiles into a washing machine or into a sling, a potential exposure path for the worker to sharps and pathogens. Additionally, disposal of bacteria-laden bags becomes a major problem, and landfill sites are increasingly burdened with materials such as plastic bags.

What is needed is a method of handling and cleaning soiled textiles that decreases occupational exposure to chemicals and pathogens, and decreases the potential for injuries to healthcare cleaning workers and providers. Thus, a systematic process for protecting the service providers and processing and cleaning the soiled healthcare facility textiles is needed.

SUMMARY OF THE INVENTION

This invention relates to a water soluble bag for containing soiled textiles, said bag having an open end, a closed end, and sides extending therebetween, said bag made of a plastic film having a thickness of at least 1.3 mils, wherein said bag dissolves in water at a temperature of 165° F. in less than about 250 seconds and does not dissolve in water at a temperature of 85° F. in 7 days, and said bag being capable of containing at least 175 lbs. of soiled textiles and having a capacity of at least 50 gallons.

This invention also relates to a receptacle for collecting soiled textiles, comprising a container having an open end, a closed end, and sides extending therebetween, a water soluble bag having an open end, a closed end, and sides extending therebetween, said bag being disposed inside said container, said bag made of a plastic film having a thickness of at least 1.3 mils, wherein said bag dissolves in water at a temperature of 165° F. in less than about 250 seconds and does not dissolve in water at a temperature of 85° F. in 7 days, and said bag being capable of containing at least 175 lbs. of soiled textiles and having a capacity of at least 50 gallons.

This invention further relates to a receptacle for collecting soiled textiles, comprising a container having an open end, a closed end, and sides extending therebetween, a sling having an open end, a second end, and sides extending therebetween, being disposed inside said container, and a water soluble bag having an open end, a closed end, and sides extending therebetween, being disposed inside said sling, said bag made of a plastic film having a thickness of at least 1.3 mils, wherein said bag dissolves in water at a temperature of 165° F. in less than about 250 seconds and does not dissolve in water at a temperature of 85° F. in 7 days, and said bag being capable of containing at least 175 lbs. of soiled textiles and having a capacity of at least 50 gallons.

DETAILED DESCRIPTION OF THE INVENTION

Figure 2:
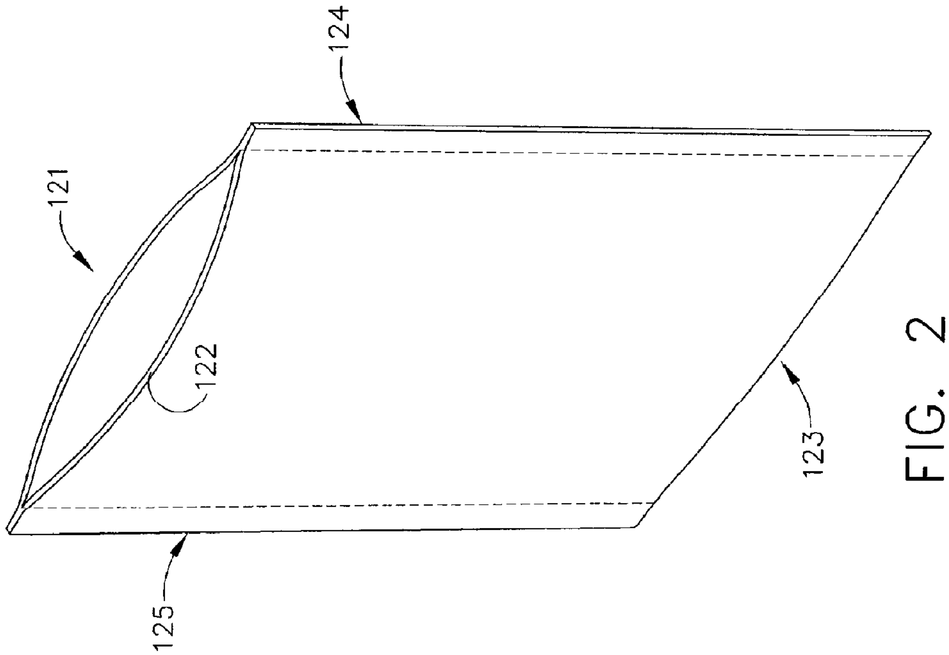
FIG. 2 is a perspective view of a water soluble bag of the invention constructed from a single sheet folded at the bottom and sealed on the sides.
Figure 1:
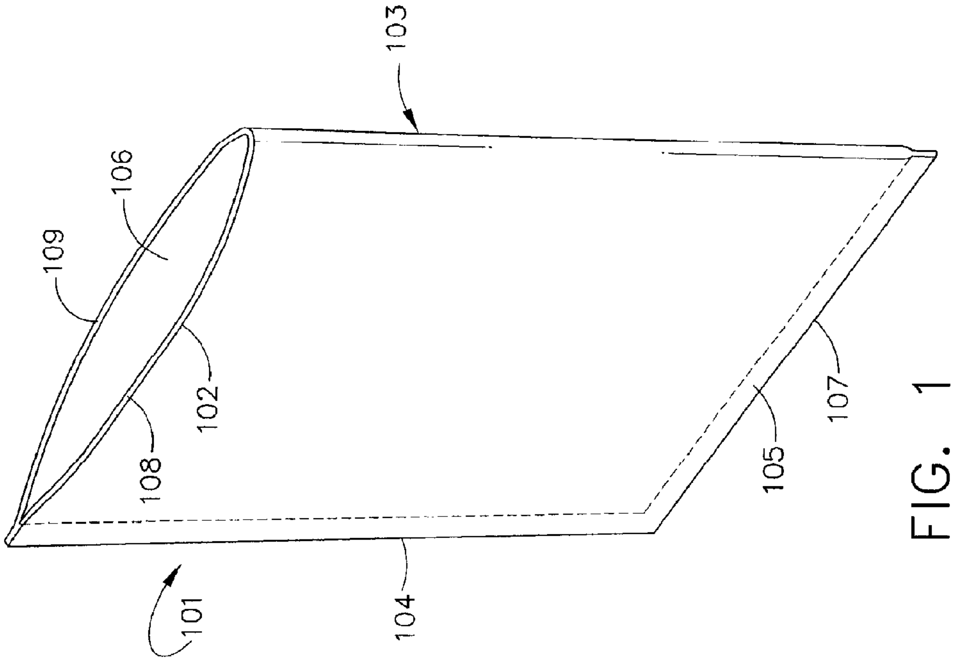
FIG. 1 is a perspective view of a water soluble bag of the invention constructed from a single sheet folded at the side and sealed at the bottom and side opposite said fold.

FIG. 1 illustrates a water soluble bag constructed from a single sheet of water soluble film folded at the side and sealed at the bottom and at the side opposite the fold. The water soluble bag 101 is formed by folding a hot water soluble flexible plastic sheet 102 of generally rectangular configuration along a bisecting line 103 and seaming the bag at bottom 105 and side 104. The water soluble bag has an open end 106, a closed end 107, and sides 108 and 109 therebetween. As depicted in FIG. 2, a water soluble bag 121 may also be formed by folding a hot water soluble flexible plastic sheet 122 of generally rectangular configuration along a bisecting line 123 and seaming it at sides 124 and 125. While the bags in FIGS. 1 and 2 are depicted as rectangular in shape, it will be understood that it may be made in any desired shape. For example, it will be appreciated that the bag may be constructed from a generally tubular body provided with such a seam at the bottom of the bag. The bag may also be reinforced to decrease the risk of leakage during handling. For example, an extra sheet of film may be added to the bottom of the bag, where the liquids are most likely to accumulate and cause the bag to prematurely rupture.

Once the water soluble bag with the soiled textiles enters the washing machine, the time it takes for the bag to rupture and/or dissolve and release its contents depends generally on the strength of the bag, but also on a number of others factors such as the quantity of liquid contained in the bag, the weight and nature of the load which is placed in the bag, and the functional characteristics of the washing machine. Typically, the bag will break down and release its contents within 90 seconds of entering the washing machine containing 165° F. water. The bag may be used with both front-loading and top-loading automatic washing machines and also with non-automatic washing machines.

The bags may be made of a hot water soluble plastic film that will dissolve in water at a temperature of 165° F. in less than about 250 seconds. Additionally, the bag will not dissolve in water at a temperature of 85° F. in 7 days. The lower temperature limit at which the bag will not dissolve for 7 days is desired for several reasons. First, while the bag is receiving soiled textiles at the healthcare facility, it may be exposed to warm temperatures and moisture for a week or more. For example, microfiber mops containing moisture may be placed in the container. Additionally, while being transported to the laundry facility, the containers holding the water soluble bags and soiled textiles may be in the back of trucks. In a warm environment, the back of the truck may reach 95° F., and it is desired that the bag not dissolve or breakdown while still in the truck. Thus, a cold water soluble bag is not appropriate for this application. A water soluble bag meeting these requirements is typically made of a hot water soluble PVA film between 1.3 mil and 1.9 mil thick, more typically between 1.4 mil and 1.8 mil thick, more typically between 1.5 mil and 1.7 mil thick, for example 1.6 mil thick. Additionally, the bag should be large enough to contain at least 175 lbs. of soiled textiles and have capacity of at least 50 gallons. The water soluble bags may hold up to 500 lbs. of laundry and may have a capacity of up to 100 gallons. Various PVA compositions known to those of ordinary skill in the art may meet this requirement.

The bag may be colored or may comprise different markings or patterns on the surface. The colors may indicate to the user the type of soiled laundry contained therein. The patterns are typically made from dyes that are not fabric substantive and do not transfer to the soiled laundry during storage of the laundry in the bag or during the washing process. Alternatively, the patterns may be embossed and/or printed on the bag.

Figure 3:
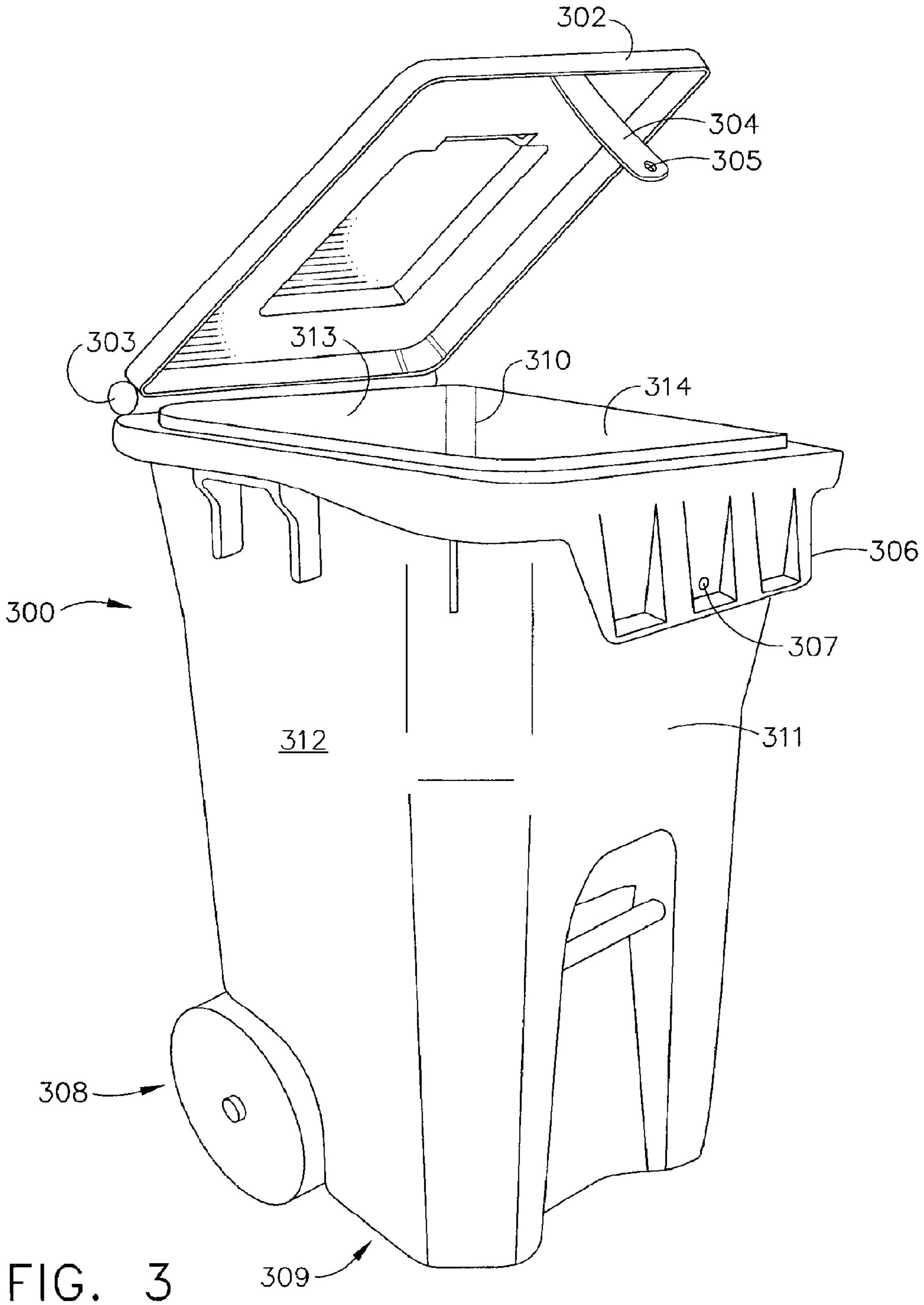
FIG. 3 is a perspective view of a container of the invention with the lid in the open position.
Figure 4:
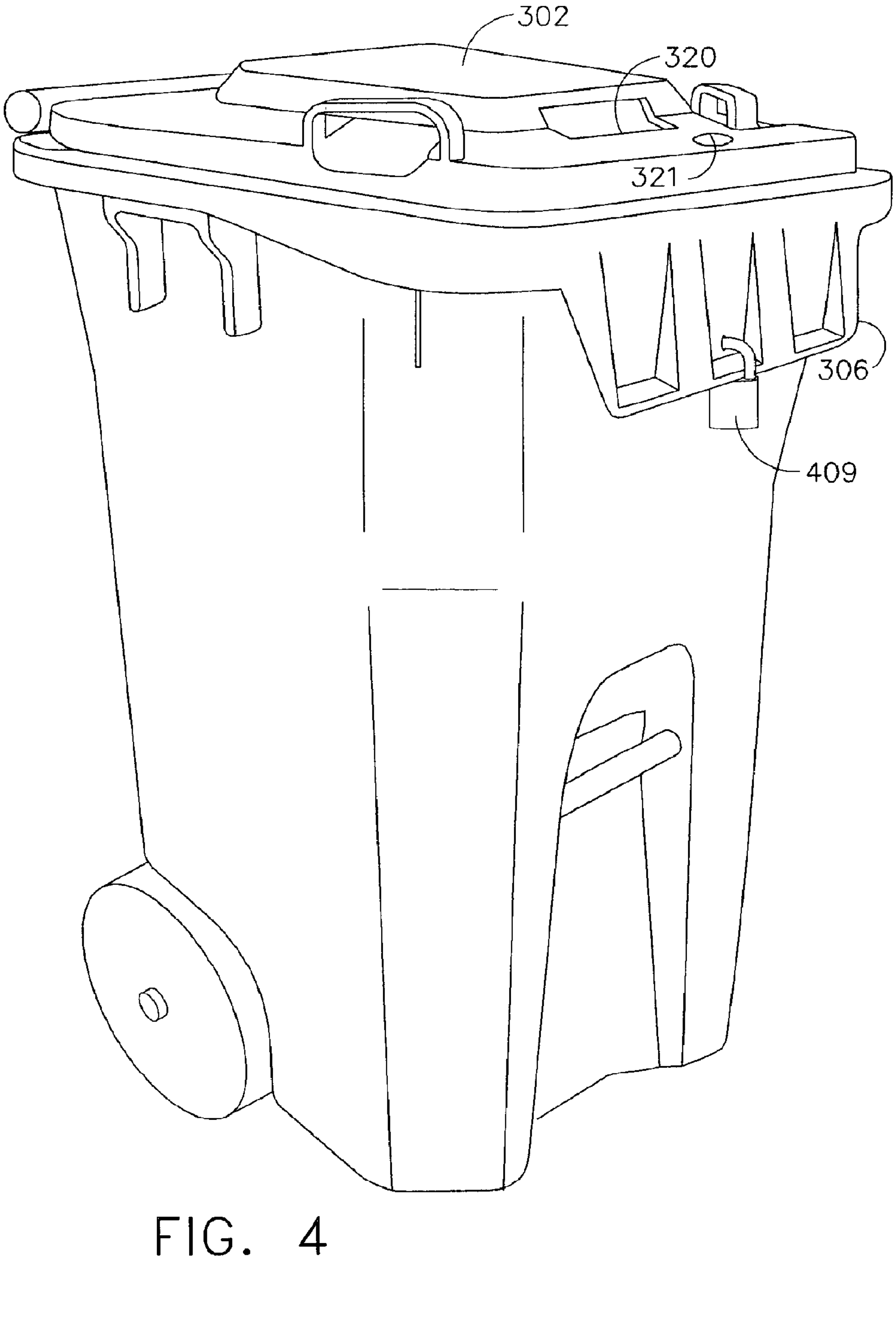
FIG. 4 is a perspective view of the container of FIG. 3 with the lid in the closed position.

Container 300 shown in FIG. 3 comprises an open end 310, a closed end 309, sides 311, 312, 313 and 314 and a lid 302 that is pivotally attached to the rear side of the body by a hinge 303. At the front of the lid 302 there is mounted a downwardly extending elongated tongue 304 having a aperture 305 in the vicinity of its free end. An apron 306 extends around the top of the open end of the container. Referring to FIG. 4, the tongue has an enlarged head 321 positioned snugly against the upper side of the lid and passes through a slot (not shown) in the lid, the tongue being secured to the lid with respect to this slot. The lid is also supplied with an opening 320 for receiving soiled textiles.

With the lid in the closed position, the tongue 304 extends downwardly immediately behind the apron 306 so that the aperture 305 in the tongue 304 registers with the aperture 307 (see FIG. 3) in the apron 306. In this position, a padlock 409 can be threaded from behind the apron through the registering apertures 305 and 307 and the padlock secured to lock the lid in the closed position. Wheels 308 may also be provided on the container to allow for easier transportation of the container.

Figure 5:
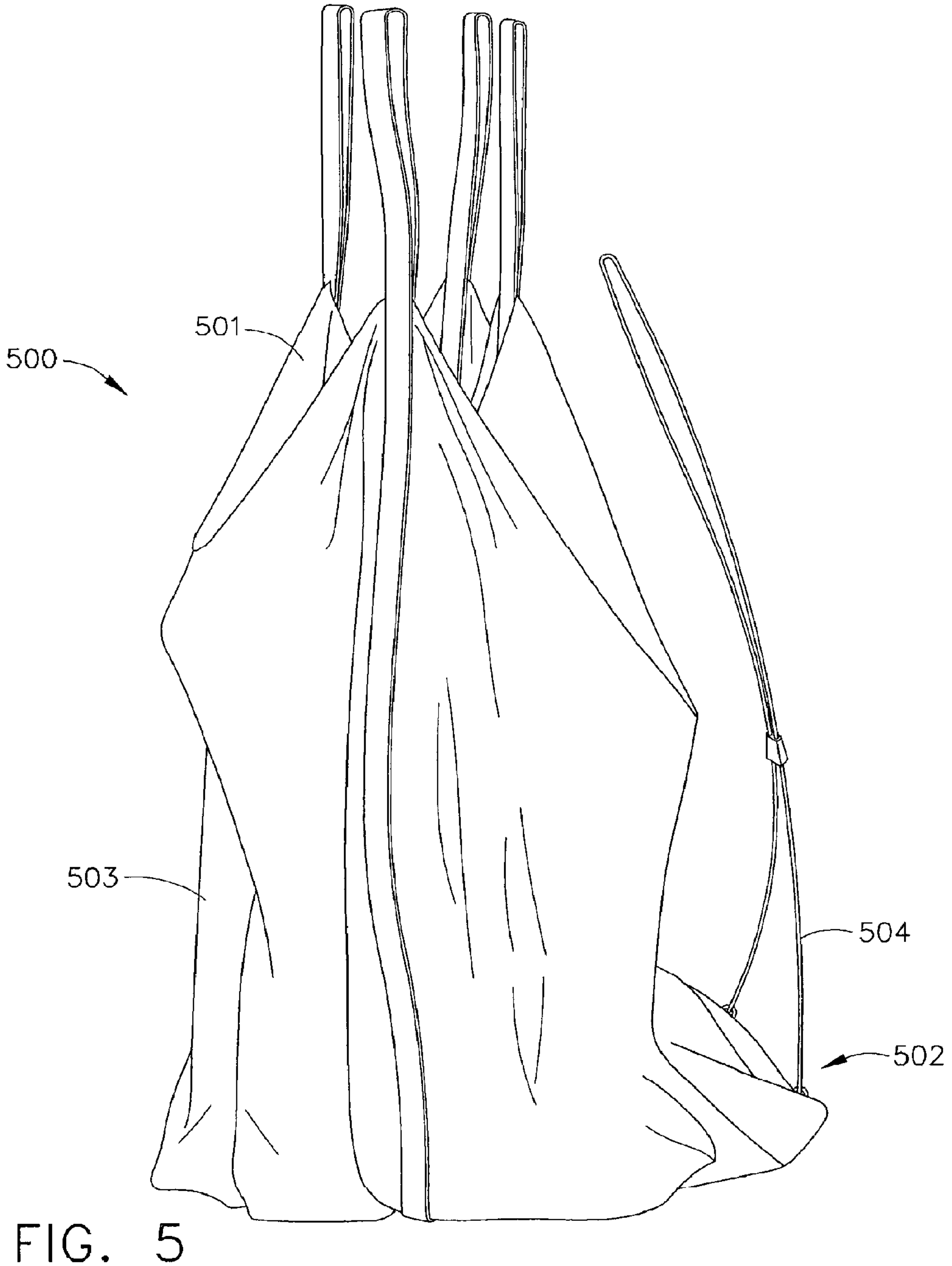
FIG. 5 is a perspective view of a sling of the invention.

Referring now to FIG. 5, there is shown a sling 500. The sling has an open first end 501, an open second end 502, and side walls 503. The second end 502 may be cinched closed to support a water soluble bag containing soiled textiles. In the embodiment shown in FIG. 5, a drawstring 504 is used to cinch the second end 502 closed.

Figure 6:
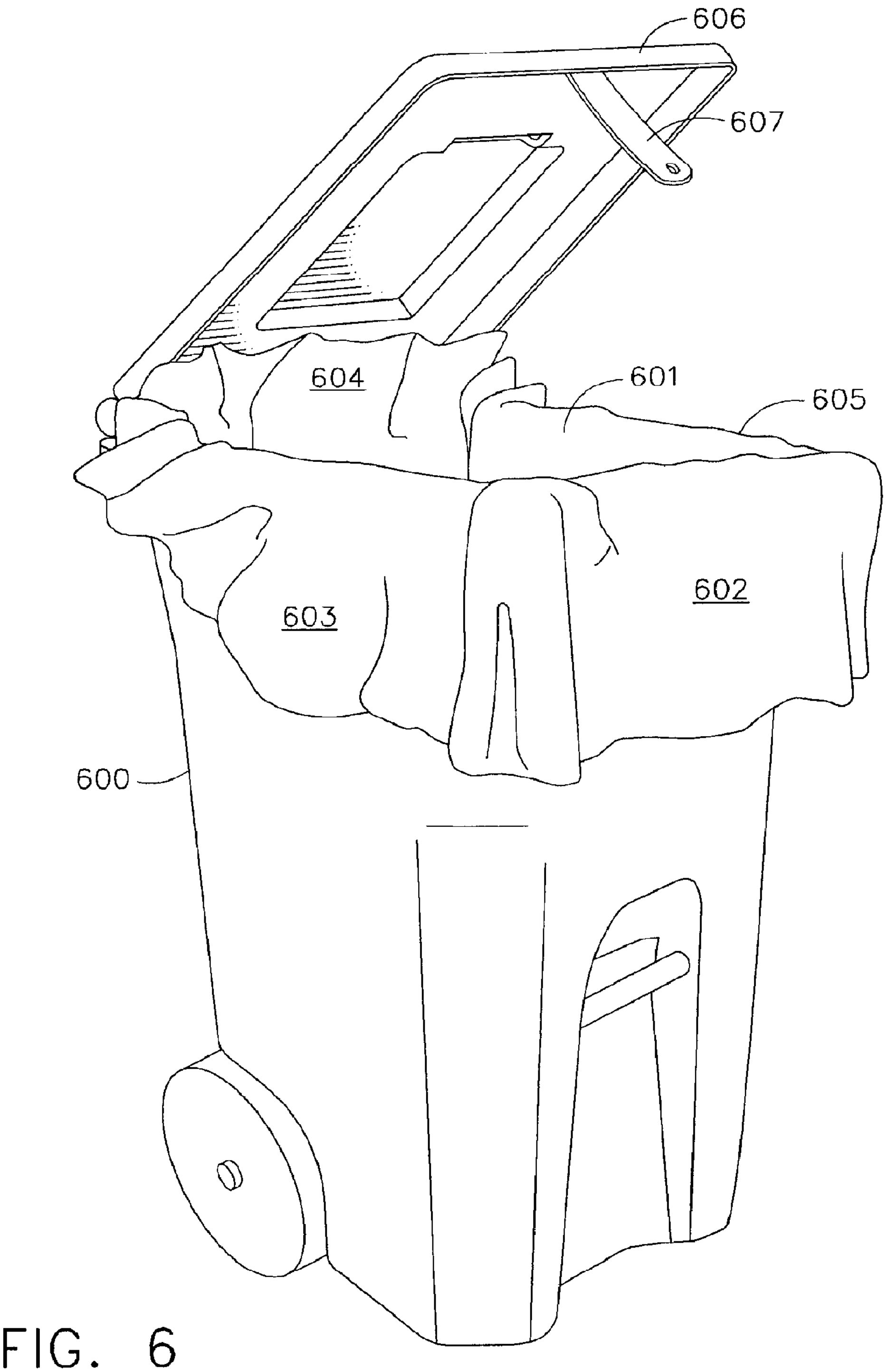
FIG. 6 is a perspective view of a container of the invention lined with a water soluble bag.

In one embodiment shown in FIG. 6, a container 600 receives a water soluble bag 601. The sides 602, 603, 604 and 605 of the open end of the bag are folded over the sides of the container 600. A lid 606 of the container 600 may then be closed and secured using the tongue 607 with a padlock as described previously. To close the lid, the tongue 607 may be used to pierce the side 602 of the bag 601, or the side 602 of the bag may be folded to allow the tongue 607 to pass by the bag 601. Closing and securing the lid 606 maintains the location of the sides 602, 603, 604 and 605 of the open end of the bag during operation so that soiled textiles are effectively contained in the bag 601.

Figure 7:
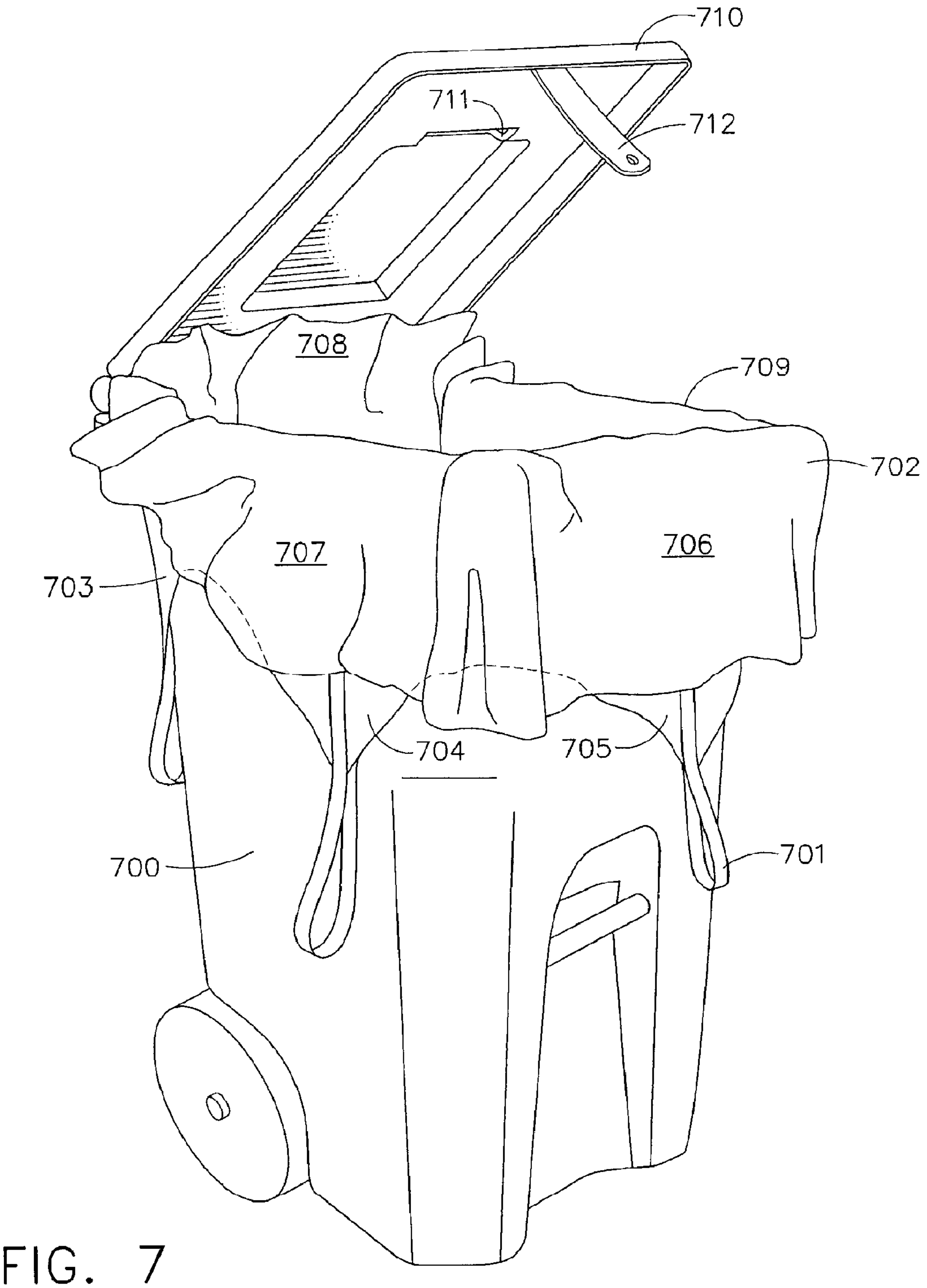
FIG. 7 is a perspective view of a container of the invention lined with a sling and a water soluble bag.

In another embodiment shown in FIG. 7, a container 700 receives a sling 701 and a water soluble bag 702. An unshown side and sides 703, 704 and 705 of the open end of the sling 701 and the sides 706, 707, 708 and 709 of the open end of the bag 702 are folded over the top of the container 700 as shown in FIG. 7. To close the lid, the side 706 of the bag and the side 705 of the sling may be folded to allow a tongue 712 to pass by the bag 702 and sling 701. A lid 710 of the container 700 is then closed and locked. The lid 710 of the container 700 serves to secure the sling 701 and bag 702 in place. The provider may provide a second water soluble bag inside the first bag if additional protection is desired.

In one operation of the invention, the textile service provider supplies the container 700 containing the sling 701 and bag 702 to the healthcare facility. Typically, the container lid 710 is locked using the tongue 712 and a padlock, such as the padlock in FIG. 4, securing the sling 701 and bag 702 in the container before delivering the assembly to the healthcare facility. The container may be marked with labels regarding appropriate textiles to place therein. The provider may spot the container at a collection location at the healthcare facility, or may deliver the container to a central location at the facility. In addition to the container, the provider may deliver clean microfiber mops and other textiles to the healthcare facility.

The healthcare cleaners use mops and other textile cleaning products, such as microfiber textiles, in their daily cleaning activities. The cleaners place soiled microfiber textiles in an opening 711 provided in the lid 710 of the container 700. As discussed previously, the water soluble liner is of sufficient thickness and design so that it will support the soiled textiles that may be wet from cleaning products.

On a regular basis, the provider retrieves the container holding the soiled textiles from the healthcare facility and delivers another container preloaded with the sling and water soluble bag to the healthcare facility. The container containing soiled textiles is loaded onto the truck and delivered to a central washing facility. Other means of transporting the container holding the soiled textiles may also be used. For instance, if the laundry facility is located within the healthcare facility, then the tote may simply be wheeled to the laundry facility.

Upon arriving at the central laundry facility, the provider moves the container from the truck to a staging area. The containers are sorted according to the materials contained therein. For example, microfibers must be kept separate from other textiles. If washed together, the fibers of traditional textiles will fill the voids in the microfiber, rendering the microfiber ineffective. Thus, it is essential that microfiber be kept separate from other cleaning textiles. The provider may use color coded water soluble liners, slings, or containers to assist in sorting the containers.

Figure 8:
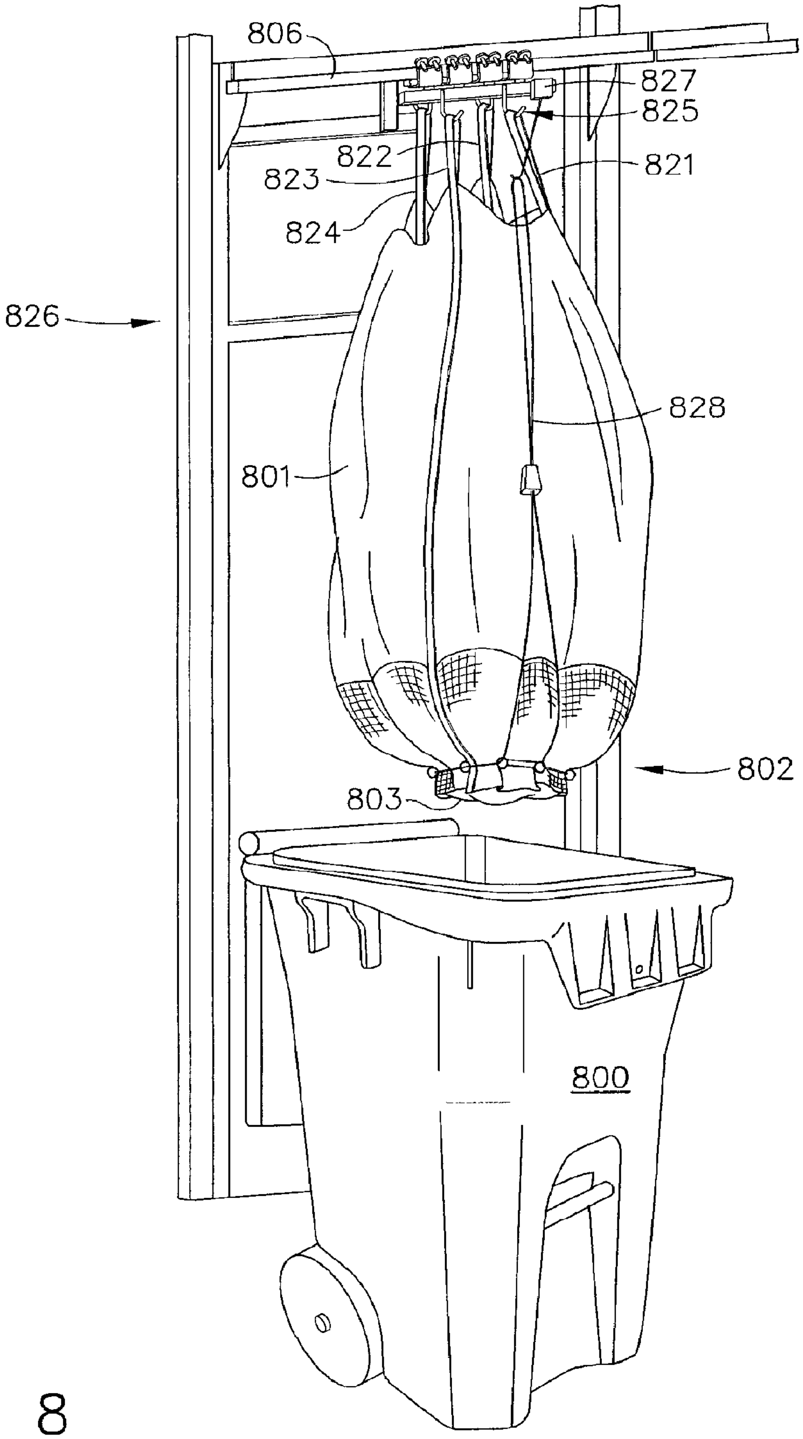
FIG. 8 is a perspective view of a sling of the invention containing a water soluble bag being removed from the container.

At the central laundry facility, an employee wheels a container 800 holding a sling 801, a water soluble bag 803, and soiled textile products under an unloading device as shown in FIG. 8. Loops 821, 822, 823 and 824 are disposed on a hook mechanism 825 located on a crane 826. Additionally, a release cord 828 for a cinched end 802 of the sling 801 is hooked onto an automated release mechanism 827. The sling 801 is then raised out of the container 800, and stopped just above the container. An end 802 of the sling 801 remains cinched closed to support the water soluble bag 803. Typically, the sling would be stopped at a height of 4-6 feet above the ground. Prior to sending the sling 801 and textiles to the washing area, an associate may check the sling and bag 803 for any leakage. If leaks are found, the sling is returned to the container. The associate then obtains a second container preloaded with an empty water soluble bag and sling (similar to the system of FIG. 7), raises the sling containing the soiled textiles out of the first container, moves the second container under the leaking sling, opens the bottom of the sling, and transfers the water soluble bag and soiled textiles into the second container. Additionally, the first container holding the sling may be disinfected using a bleach solution, with the container surfaces kept moist with the bleach solution for at least 10 minutes. If the water soluble bag has leaked, the sling typically is washed. The sling is washed separate from the microfiber products to prevent fibers from the sling filling the voids of the microfiber products, rendering them ineffective. The operator then sends the sling with soiled textiles and water soluble bag to the wash room. The sling travels on a rail 806 to a staging area, and finally to a washing machine.

Figure 9:
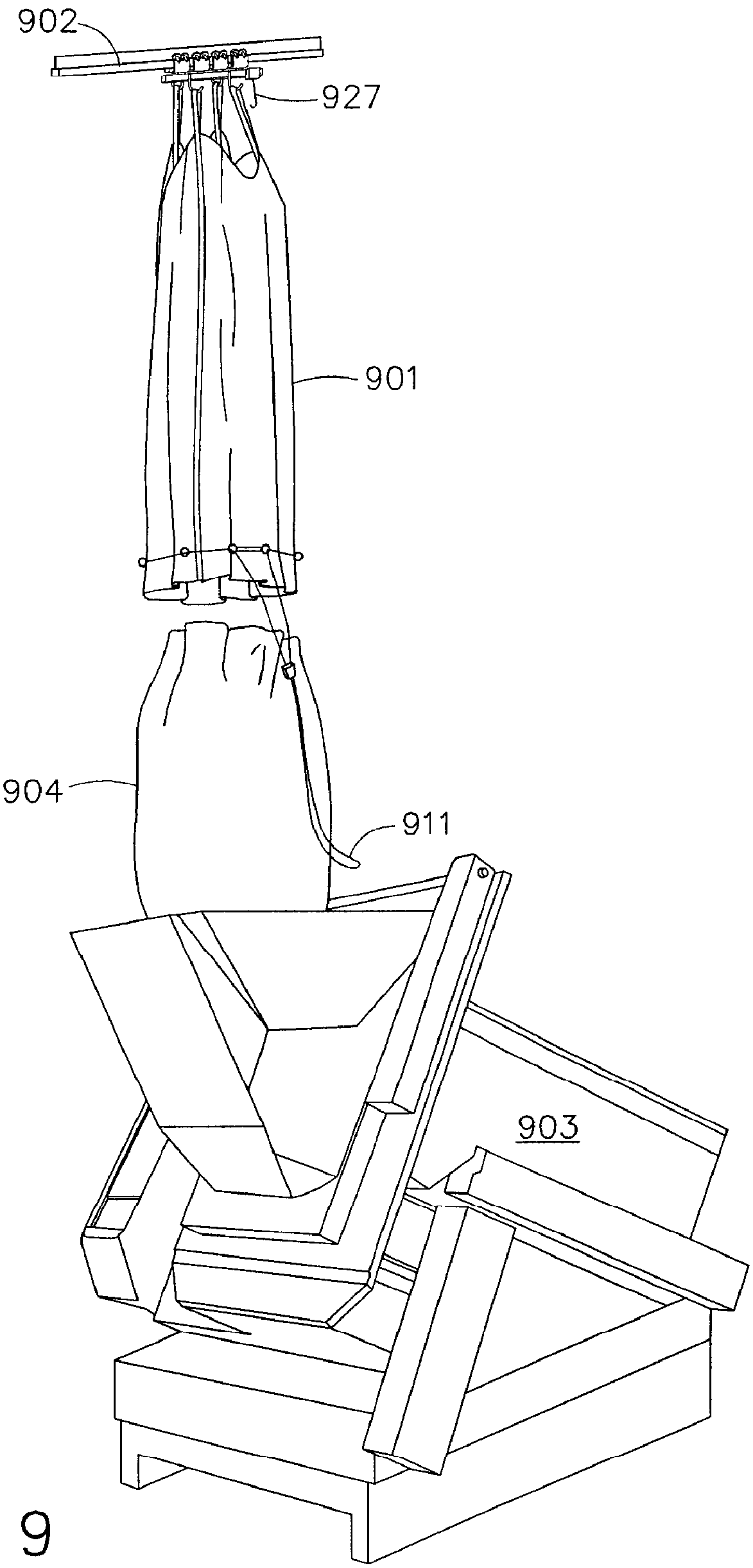
FIG. 9 is a perspective view of a water soluble bag of the invention containing soiled textiles released into a washer.

As shown in FIG. 9, a sling 901 travels along a rail 902, stopping at a position above a washing machine 903. An automated release mechanism 927 pulls a cord 911, releasing a water soluble bag 904 containing the soiled textiles into the washing machine. Depending upon the washing machine's capacity, a single load may consist of multiple water soluble bags containing soiled textiles.

Pursuant to the Center for Disease Control Guidelines for hospital laundry, the soiled textiles are washed in 160° F. water for 25 minutes with 50-150 PPM total available chlorine. More typically, the textiles are washed at 165° F. for 25 minutes, followed by 8 minutes of washing at 145° to 150° F. in a chlorine solution containing 5-12 ounces of 10-12% chlorine bleach per hundred weight of soiled product. The load is then rinsed using three 2 minute rinse cycles, one with hot water, typically 130° F., followed by two cycles of cold water, or water less than 90° F.

Figure 10:
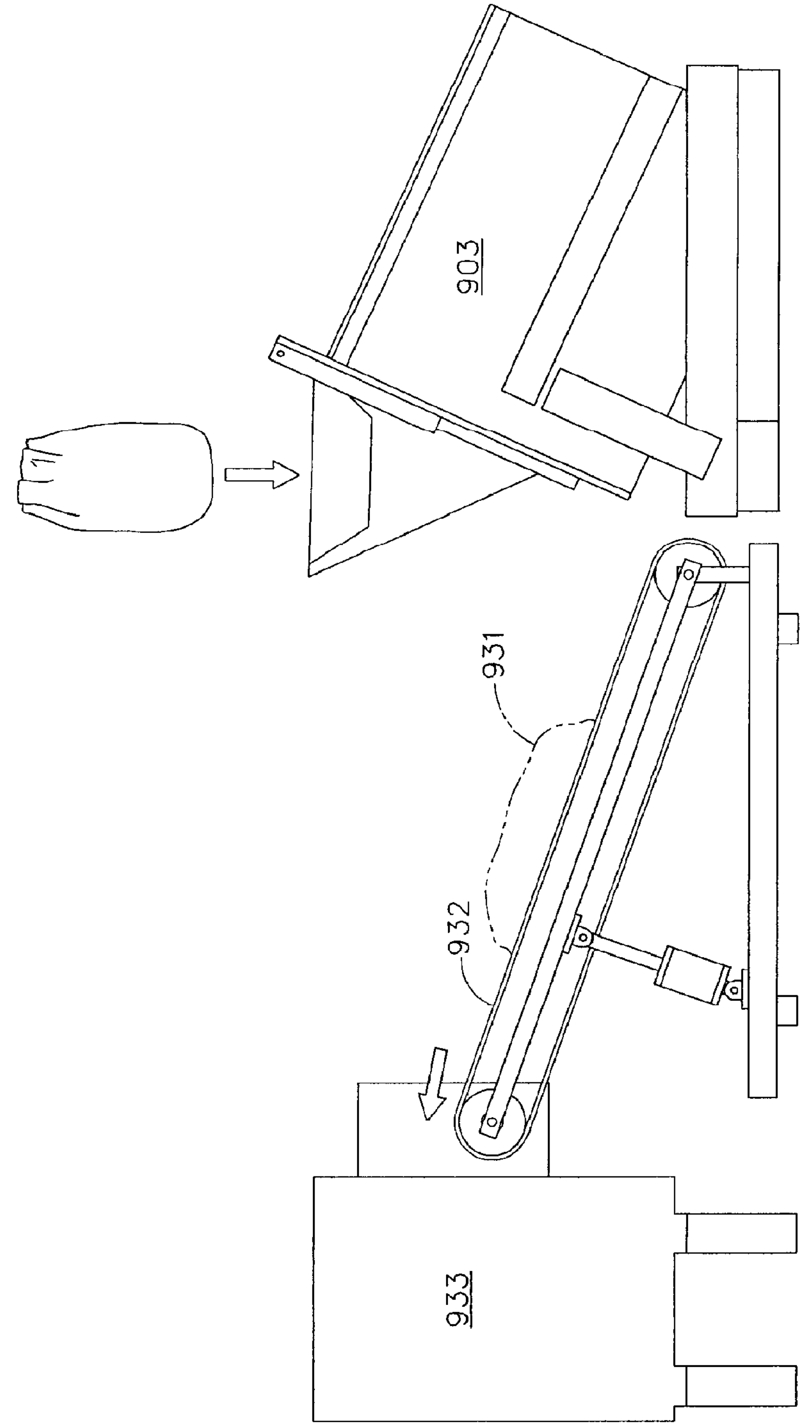
FIG. 10 is a perspective view of a washing machine, washed laundry transfer mechanism, and dryer.

After the textiles are washed, they are transferred to a dryer. As shown in FIG. 10, washed textiles 931 are unloaded from the washing machine 903 onto a conveyor system 932. The conveyor system 932 transfers the textiles to a dryer 933. Other systems for transferring the washer textiles from the washing machine to the dryer 933 may be utilized. For example, if the facility does not have a conveyer system available, the unloading of the washing machine and transferring to the dryer may take place by hand. After drying, the textiles are sorted and checked for foreign objects, such as a foreign textile or sharps.

Under ordinary operating conditions, as the above description shows, the provider does not touch the soiled textiles. The soiled textiles are confined in the water soluble bag and sling from the time they are collected until they exit the washing machine. Only then, after the textiles are disinfected, washed, and dried, are they check for foreign objects, such as needles. Even if a needle stick occurs, the risk of infection is virtually eliminated because the needle has been through the wash and disinfecting cycle. The reduced handling of the soiled textiles described herein reduces a providers' exposure to pathogens.

While the present invention has been illustrated by the description of embodiments thereof, and while the embodiments have been described in considerable detail, it is not intended to restrict or in any way limit the scope of the appended claims to such detail. Additional advantages and modifications will be readily apparent to those skilled in the art. The invention in its broader aspects is therefore not limited to the specific details, representative apparatus and method, and illustrated examples shown and described. Accordingly, departures may be made from such details without departing from the scope or spirit of the invention.

What is claimed is:

1. A receptacle for collecting soiled textiles, comprising:

a container having an open end, a closed end, and sides extending therebetween, a sling having an open end, a second end having an opening that can be selectively closed, and sides extending therebetween, being disposed in and supported by said container, and a water soluble bag having an open end, a closed end, and sides extending therebetween, being disposed inside said sling, said bag made of a plastic film having a thickness of at least 1.3 mils, wherein said bag dissolves in water at a temperature of 165° F. in less than about 250 seconds and does not dissolve in water at a temperature of 85° F. in 7 days, and said bag being capable of containing at least 175 lbs. of soiled textiles and having a capacity of at least 50 gallons, wherein said bag is disposed in said sling, the closed end of said water soluble bag being supported by said second end of said sling when said opening of said second end is closed.

2. The receptacle according to claim 1, wherein the second end of said sling has an opening that can be cinched closed.

3. The receptacle according to claim 1, further comprising a lid mounted on said container.

4. The receptacle according to claim 1, further comprising a lid with an opening for receiving the soiled textiles mounted on said container.

5. The receptacle according to claim 4, wherein said lid secures the open end of said bag to the open end of said container.

6. The receptacle according to claim 1, wherein said water soluble bag is made from a polyvinyl alcohol film.

7. The receptacle according to claim 1 wherein the bag has a thickness of at least 1.5 mils.

8. The receptacle according to claim 1 wherein the bag is made from a polyvinyl alcohol film, having a thickness of at least 1.5 mils, and measuring at least 60 inches square.

* * * * *